US008122470B2

United States Patent
Kendall et al.

(10) Patent No.: US 8,122,470 B2
(45) Date of Patent: Feb. 21, 2012

(54) METHOD FOR PROVIDING AN ELECTRONIC PROGRAM GUIDE BASED ON USER PREFERENCE DATA

(75) Inventors: Scott Allan Kendall, Westfield, IN (US); Carrie Michelle Evans, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 544 days.

(21) Appl. No.: 11/920,403

(22) PCT Filed: May 23, 2005

(86) PCT No.: PCT/US2005/017918
§ 371 (c)(1),
(2), (4) Date: Nov. 14, 2007

(87) PCT Pub. No.: WO2006/126988
PCT Pub. Date: Nov. 30, 2006

(65) Prior Publication Data
US 2009/0070809 A1    Mar. 12, 2009

(51) Int. Cl.
*H04N 7/10*    (2006.01)
*H04N 7/025*   (2006.01)
*H04N 5/445*   (2011.01)
*G06F 3/00*    (2006.01)
*G06F 13/00*   (2006.01)
*H04H 60/33*   (2008.01)

(52) U.S. Cl. .............. 725/46; 725/34; 725/35; 725/50; 725/9

(58) Field of Classification Search .............. None
See application file for complete search history.

(56) References Cited

U.S. PATENT DOCUMENTS

| 6,088,722 | A | 7/2000 | Herz et al. | |
| 2002/0083451 | A1* | 6/2002 | Gill et al. | 725/46 |
| 2002/0104081 | A1 | 8/2002 | Candelore et al. | |
| 2002/0104087 | A1* | 8/2002 | Schaffer et al. | 725/46 |
| 2002/0188947 | A1* | 12/2002 | Wang et al. | 725/45 |
| 2003/0110500 | A1* | 6/2003 | Rodriguez | 725/46 |
| 2005/0193414 | A1* | 9/2005 | Horvitz et al. | 725/46 |
| 2009/0282428 | A1* | 11/2009 | Rodriguez | 725/9 |

FOREIGN PATENT DOCUMENTS

| JP | 7-15677 | 1/1995 |
| JP | 07255050 A | 2/1996 |
| JP | 11-220673 | 8/1999 |

(Continued)

OTHER PUBLICATIONS

International Search Report dated Mar. 6, 2006.

*Primary Examiner* — Andrew Koenig
*Assistant Examiner* — Jason J Chung
(74) *Attorney, Agent, or Firm* — Robert D. Shedd; Joseph J. Opalach; Reitseng Lin

(57) ABSTRACT

An apparatus such as a television signal receiver provides an electronic program guide based on user preference data collected at different time intervals in a day. According to an exemplary embodiment, the apparatus includes a memory operative to store first and second sets of user preference data collected at respective first and second time intervals in a day, and a processor operative to enable display of an electronic program guide including a list of channels. The channels are arranged in the list based on one of the first and second sets of user preference data.

15 Claims, 3 Drawing Sheets

FOREIGN PATENT DOCUMENTS

| | | |
|---|---|---|
| JP | 11-220675 | 8/1999 |
| JP | 2000-253325 | 9/2000 |
| JP | 2000-333085 | 11/2000 |
| JP | 2001-223959 | 8/2001 |
| JP | 2003-333447 | 11/2003 |
| JP | 2005-39749 | 2/2005 |
| WO | WO 99/01984 A | 1/1999 |
| WO | WO 99/35841 A | 7/1999 |
| WO | WO 99/35843 A | 7/1999 |
| WO | 2004/043070 A1 | 5/2004 |

* cited by examiner

METHOD FOR PROVIDING AN ELECTRONIC PROGRAM GUIDE BASED ON USER PREFERENCE DATA

This application claims the benefit, under 35 U.S.C. §365 of International Application PCT/US2005/017918 filed May 23, 2005, which was published in accordance with PCT Article 21(2) on Nov. 30, 2006.

BACKGROUND OF THE INVENTION

1. Field of the Invention

The present invention generally relates to electronic program guides, and more particularly, to a method for providing an electronic program guide based on user preference data collected at different time intervals in a day.

2. Background Information

Due to the advent of cable television, direct satellite systems, and other television and radio broadcast systems, television viewers and radio listeners often have very large numbers of channels and programs from which to select. To assist in channel selection, current apparatuses often provide an on-screen menu known as an electronic program guide. An electronic program guide is an interactive, on-screen equivalent to program listings found in local newspapers or other print media. An electronic program guide can provide various different kinds of information about each program that is within the time interval covered by the electronic program guide. The time interval may, for example, range from the next hour up to fourteen days in advance. Electronic program guide information is often displayed in a two dimensional table or grid format with time on one axis and channel number on the other axis.

Unlike non-interactive guides that reside on a dedicated channel and merely scroll through the current programming on other channels, electronic program guides allow users to select a channel at any time within the guide's time range. Moreover, electronic program guide features include the ability to highlight individual cells of the grid containing program information. Once highlighted, the viewer can perform functions pertaining to that highlighted program. For instance, a user could instantly switch to that program if it is currently being aired, and/or select the program for recording.

Because electronic program guides provide users with such a large number of channels and programs from which to select, the process of navigating and selecting a desired channel from the guide can be overwhelming for users. Moreover, since digital compression can limit how quickly certain devices can change channels, simply surfing the electronic program guide for a desired channel is not necessarily an effective means of channel selection.

One approach for facilitating channel selection with an electronic program guide is to arrange channels in the guide based on revenues received by the broadcaster, with those channels generating the highest revenues being listed first. This approach, however, is more of a business model than a channel selection technique, and does not necessarily assist users in selecting their favorite channels and programs. Moreover, many users may dislike this approach since their favorite channels may appear very far down in the guide listing.

Another approach for facilitating channel selection with an electronic program guide is to provide a user profile feature in which users can set various parameters to block certain channels in the guide listing, and to save certain channels to a list of favorites. This approach, however, is problematic because these types of features are often not used by consumers since they may be considered too difficult, or too much trouble, to set up.

Heretofore, the problem of providing an electronic program guide that facilitates channel selection by users has not been adequately addressed. Accordingly, there is a need for a method and apparatus for providing an electronic program guide which better facilitates channel selection by users. The present invention addresses these and/or other issues.

SUMMARY OF THE INVENTION

In accordance with an aspect of the present invention, a method for providing an electronic program guide is disclosed. According to an exemplary embodiment, the method comprises steps of collecting first and second sets of user preference data at respective first and second time intervals in a day, and enabling display of the electronic program guide including a list of channels. The channels are arranged in the list based on one of the first and second sets of user preference data.

In accordance with another aspect of the present invention, an apparatus for providing an electronic program guide is disclosed. According to an exemplary embodiment, the apparatus comprises memory means for storing first and second sets of user preference data collected at respective first and second time intervals in a day, and processing means for enabling display of said electronic program guide including a list of channels. The channels are arranged in the list based on one of the first and second sets of user preference data.

In accordance with yet another aspect of the present invention, a television signal receiver is disclosed. According to an exemplary embodiment, the television signal receiver comprises a memory operative to store first and second sets of user preference data collected at respective first and second time intervals in a day, and a processor operative to enable display of an electronic program guide including a list of channels. The channels are arranged in said list based on one of the first and second sets of user preference data.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
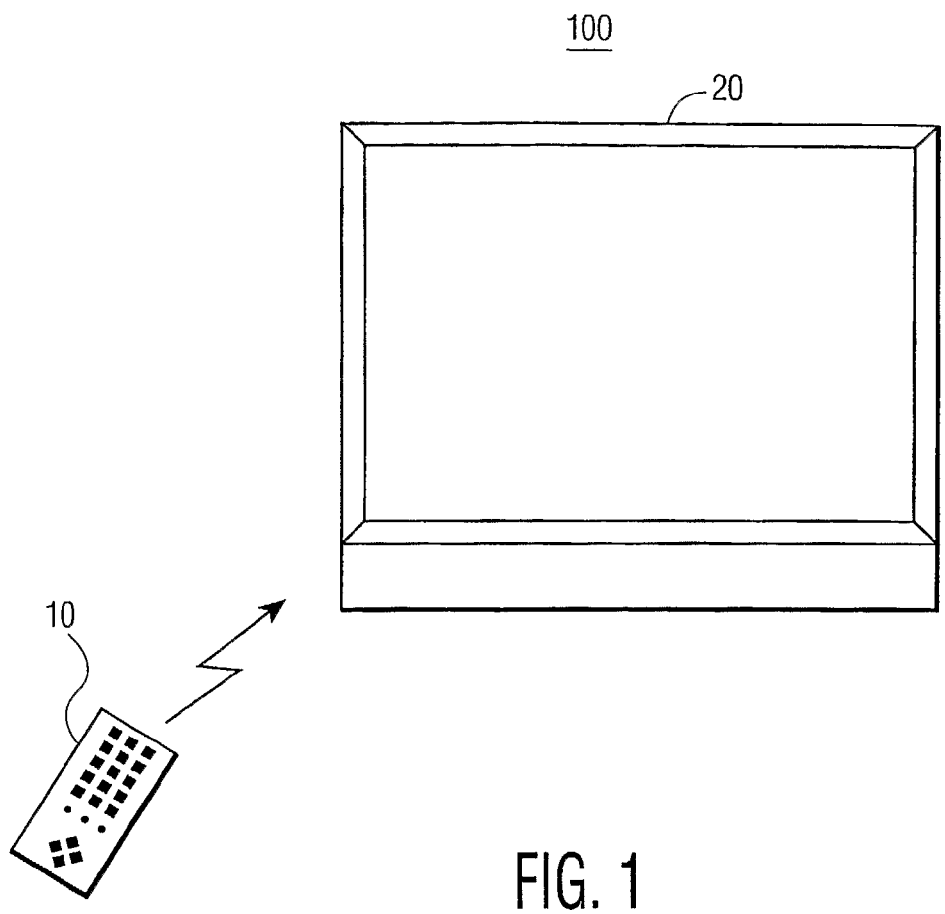
FIG. 1 is an exemplary environment suitable for implementing the present invention.

Referring now to the drawings, and more particularly to FIG. 1, an exemplary environment 100 suitable for implementing the present invention is shown. As indicated in FIG. 1, environment 100 comprises a user input device 10, and an apparatus 20 capable of providing an electronic program guide. According to an exemplary embodiment, apparatus 20 is embodied as a television signal receiver having an integrated display device, but may be embodied as an apparatus or device that does not include an integrated display device (e.g., set-top box, etc.). Apparatus 20 may also be embodied as an audio device such as a radio.

User input device 10 is operative to generate and output control signals that control the operation of apparatus 20 and/or other devices. According to an exemplary embodiment, user input device 10 includes a plurality of input keys and outputs control signals in a wired and/or wireless (e.g., via infrared or radio frequency (RF) link, etc.) manner responsive to user depression of its input keys. User input device 10 may for example be embodied as a hand-held remote control device, wired and/or wireless keyboard, integrated control panel of apparatus 20, and/or other user input device.

Apparatus 20 is operative to receive signals including audio, video and/or data signals having one or more types of analog modulation (e.g., NTSC, PAL, SECAM, etc.) and one or more types of digital modulation (e.g., QPSK, QAM, VSB, etc.) from one or more signal sources such as cable, terrestrial, satellite, internet and/or other signal sources and to provide aural and/or visual outputs corresponding to these received signals. Apparatus 20 is also operative to process received signals and provide the resulting processed signals to one or more other devices, and to receive signals from other devices.

Apparatus 20 is further operative to provide an electronic program guide in accordance with principles of the present invention. According to an exemplary embodiment, apparatus 20 collects user preference data at each time interval of the day, and enables display of the electronic program guide using the collected user preference data. According to this exemplary embodiment, the electronic program guide includes a list of channels arranged in an order based on the user preference data for the particular time interval the guide is being displayed. For example, if the electronic program guide is displayed during a first time interval of the day (e.g., 7:30 am to 9:00 am), user preference data collected during this first time interval is used to determine the order in which channels are arranged in the guide listing. Similarly, if the electronic program guide is displayed during a second time interval of the day (e.g., 10:00 pm to 11:30 pm), user preference data collected during this second time interval is used to determine the order in which channels are arranged in the guide listing. As will be described later herein, the user preference data includes data (i.e., points) indicating the amount of time each channel is tuned to during each time interval. The duration of each time interval may be set as a matter of design choice. Further details regarding these aspects of apparatus 20 will be provided later herein.

Figure 2:
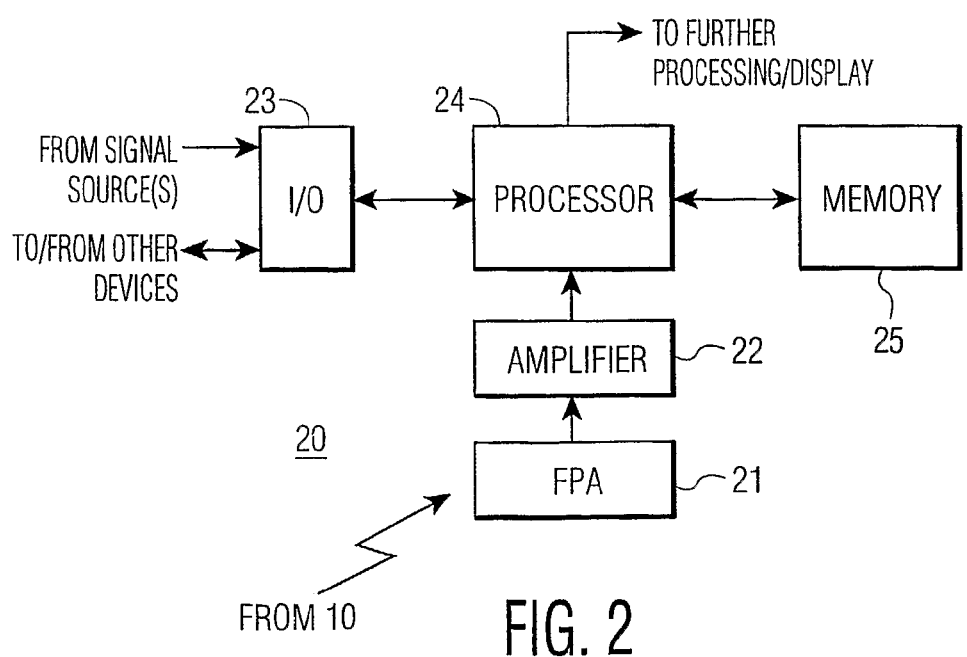
FIG. 2 is a diagram providing further details of the apparatus of FIG. 1 according to an exemplary embodiment of the present invention.

Referring to FIG. 2, a diagram providing further details of apparatus 20 of FIG. 1 according to an exemplary embodiment of the present invention is shown. Apparatus 20 of FIG. 2 comprises front panel means such as front panel assembly (FPA) 21, amplifying means such as amplifier 22, and input/output (I/O) means such as I/O block 23, processing means such as processor 24, and memory means such as memory 25.

Some of the foregoing elements of FIG. 2 may be embodied using integrated circuits (ICs), and some elements may for example be included on one or more ICs. For clarity of description, certain conventional elements associated with apparatus 20 such as certain control signals, power signals and/or other elements may not be shown in FIG. 2.

FPA 21 is operative to receive user inputs from user input device 10, and to output signals corresponding to the user inputs to amplifier 22. According to an exemplary embodiment, FPA 21 receives signals, such as IR and/or RF signals, from user input device 10 and generates corresponding signals which are output to amplifier 22. Amplifier 22 is operative to amplify the signals provided from FPA 21 for output to processor 24.

I/O block 23 is operative to perform I/O functions of apparatus 20. According to an exemplary embodiment, I/O block 23 is operative to receive signals such as audio, video and/or data signals in analog and digital modulation formats from one or more signal sources such as cable, terrestrial, satellite, internet and/or other signal sources. Although not expressly shown in FIG. 2, I/O block 23 may include a plurality of input terminals each designated to receive signals from a given signal source. For example, I/O block 23 may include separate input terminals for receiving signals from cable, antenna (i.e., terrestrial), satellite, internet and/or other signal sources. I/O block 23 is also operative to output processed signals to one or more other devices, and to receive signals from such devices.

Processor 24 is operative to perform various signal processing and control functions of apparatus 20. According to an exemplary embodiment, processor 24 processes the audio, video and/or data signals provided from I/O block 23 by performing functions including channel tuning, analog and digital demodulation, and other functions to thereby generate data representing audio, video and/or data content. The data produced from such processing functions may be provided for further processing (e.g., MPEG decoding, etc.) and output. Also according to an exemplary embodiment, processor 24 detects and processes user inputs provided via user input device 10, and may control its own operations and/or output control signals to control other elements of apparatus 20 (including elements not shown in FIG. 2) responsive to such user inputs.

Processor 24 is also operative to execute software code that enables display of an electronic program guide in accordance with principles of the present invention. According to an exemplary embodiment, processor 24 causes user preference data in the form of points to be collected in memory 25 at each time interval of the day, and enables display of the electronic program guide using these points. According to this exemplary embodiment, processor 24 assigns points to channels during each time interval of the day based primarily on the amount of time each channel is tuned to during each time interval. Processor 24 causes channels to be arranged in the guide listing based on the number of points assigned to each channel for the particular time interval the guide is being displayed. For example, if the electronic program guide is displayed during a first time interval of the day (e.g., 7:30 am to 9:00 am), the points assigned by processor 24 during this first time interval are used to determine the order in which channels are arranged in the guide listing. Similarly, if the electronic program guide is displayed during a second time interval of the day (e.g., 10:00 pm to 11:30 pm), the points assigned by processor 24 during this second time interval are used to determine the order in which channels are arranged in the guide listing. According to an exemplary embodiment, the channels are listed sequentially in the guide listing with those channels having the highest number of points listed first. Processor 24 is also operative to perform and/or enable other functions of apparatus 20 including, but not limited to, detecting inputs to apparatus 20, reading and writing data from and to memory 25, and/or other functions.

Memory 25 is operative to perform data storage functions of apparatus 20. According to an exemplary embodiment, memory 25 stores data including, but not limited to, software code, electronic program guide data including user preference data for different time intervals, and/or other data. Memory 25 may include volatile and/or non-volatile memory regions.

Figure 3:
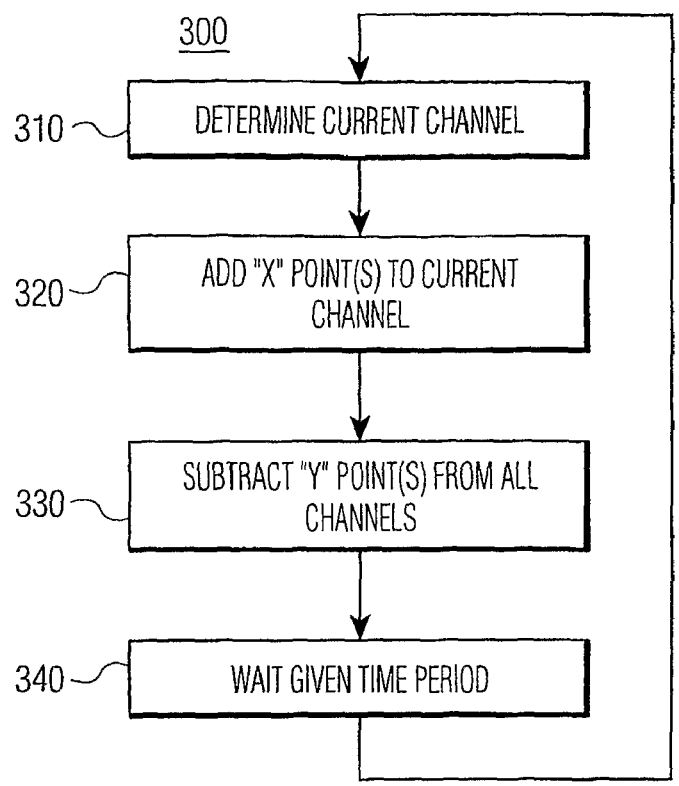
FIG. 3 is a flowchart illustrating exemplary steps according to one aspect of the present invention.

Referring to FIG. 3, a flowchart 300 illustrating exemplary steps according to one aspect of the present invention is shown. In particular, FIG. 3 illustrates the process in which points are assigned to channels during each time interval of the day. Accordingly, the steps of FIG. 3 are repeated for each separate time interval, and the duration of each time interval may be set as a matter of design choice. For purposes of example and explanation, the steps of FIG. 3 will be described with reference to apparatus 20 as previously described herein. The steps of FIG. 3 are merely exemplary, and are not intended to limit the present invention in any manner.

At step 310, apparatus 20 determines which channel it is currently tuned to. According to an exemplary embodiment, processor 24 is programmed to perform step 310 by monitoring its channel tuning function and thereby detecting the channel that apparatus 20 is currently tuned to.

At step 320, apparatus 20 adds "X" number of points to the currently tuned channel for the current time interval. According to an exemplary embodiment, processor 24 is programmed to add "X" points to the currently tuned channel for the current time interval at step 320, where "X" is a predetermined number set as a matter of design choice. For example, "X" may be set equal to 100. In general, a greater value for "X" indicates that a greater user preference is ascribed to a currently tuned channel, and vice-versa. The points added at step 320 are recorded in memory 25 under the control of processor 24.

At step 330, apparatus 20 subtracts "Y" number of points from all channels for the current time interval. According to an exemplary embodiment, processor 24 is programmed to subtract "Y" points from all channels for the current time interval at step 330, where "Y" is a predetermined number set as a matter of design choice. For example, "Y" may be set equal to 1. In general, a greater value for "Y" indicates that the user preference for all channels declines at a greater rate, and vice-versa. The points subtracted at step 330 are recorded in memory 25 under the control of processor 24.

At step 340, apparatus 20 waits a given time period, and then repeats steps 310 to 330 as previously described herein. According to an exemplary embodiment, processor 24 is programmed to wait the given time period at step 340, which may be set as a matter of design choice. For example, the time period used at step 340 may be equal to one minute. In general, the longer the time period used at step 340, the slower user preferences are established, and vice-versa.

Figure 4:
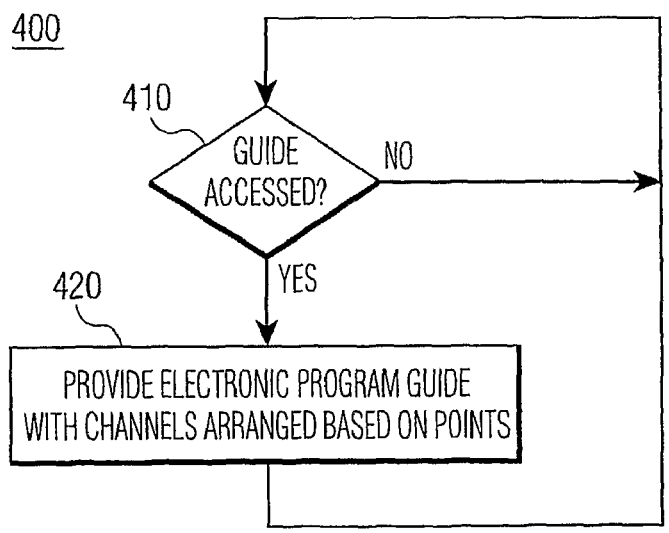
FIG. 4 is a flowchart illustrating exemplary steps according to another aspect of the present invention.

Referring to FIG. 4, a flowchart 400 illustrating exemplary steps according to another aspect of the present invention is shown. In particular, FIG. 4 illustrates how an electronic program guide according to the present invention may be provided. For purposes of example and explanation, the steps of FIG. 4 will be described with reference to user input device 10 and apparatus 20 as previously described herein. The steps of FIG. 4 are merely exemplary, and are not intended to limit the present invention in any manner.

At step 410, a determination is made as to whether the electronic program guide of apparatus 20 has been accessed. According to an exemplary embodiment, processor 24 is programmed to detect when the electronic program guide is accessed at step 410, and the guide may for example be accessed by a user pressing a predetermined key of user input device 10. As indicated in FIG. 4, step 410 is repeated until processor 24 detects that the electronic program guide of apparatus 20 is accessed.

Figure 5:
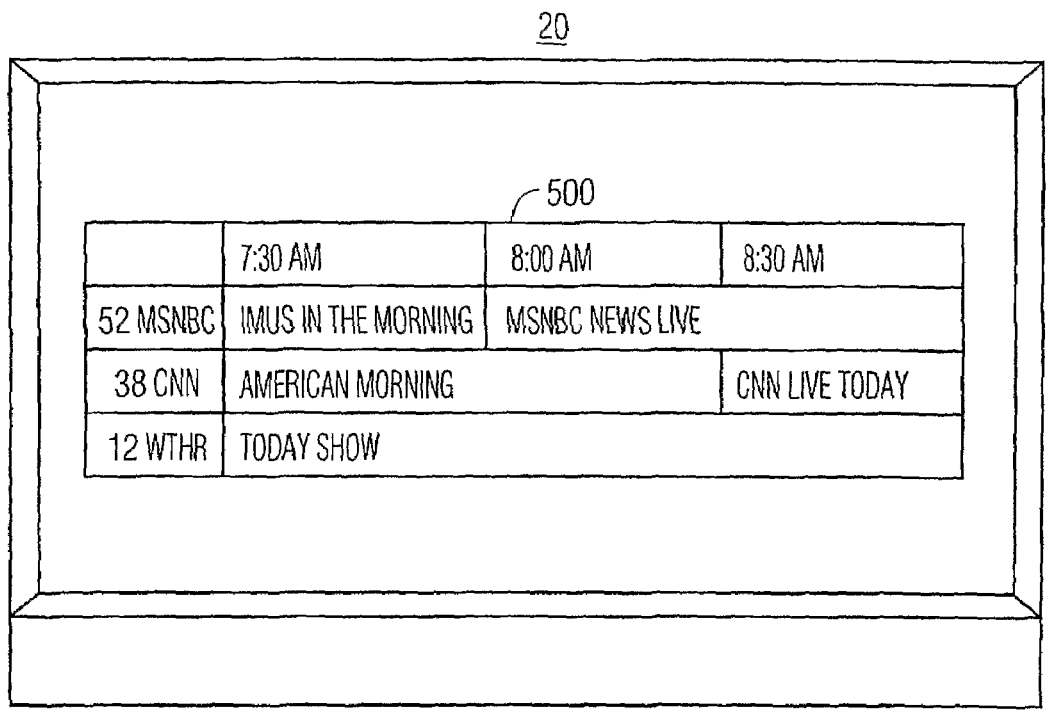
FIG. 5 is a display of an electronic program guide according to an exemplary embodiment of the present invention.
Figure 6:
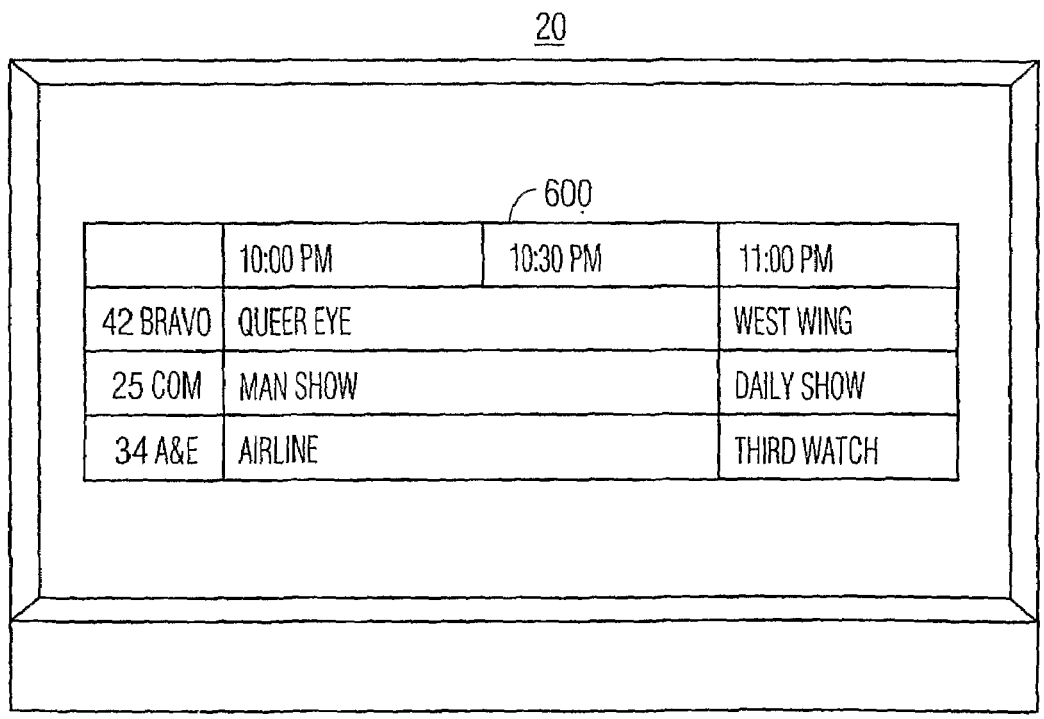
FIG. 6 is another display of an electronic program guide according to an exemplary embodiment of the present invention.

Once the determination at step 410 is positive, process flow advances to step 420 where apparatus 20 provides an electronic program guide with channels arranged based on points for the current time interval. According to an exemplary embodiment, the channels are listed sequentially in the guide listing with those channels having the highest number of points listed first. As previously described herein, processor 24 assigns points to channels at each time interval of the day in the manner shown in FIG. 3. Accordingly, processor 24 enables the electronic program guide to be displayed at step 420 based on the number of points assigned to channels for the current time interval in which the electronic program guide is being accessed. For example, if the electronic program guide is accessed at step 420 during a first time interval of the day (e.g., 7:30 am to 9:00 am), the points assigned by processor 24 during this first time interval are used to determine the order in which channels are arranged in the guide listing. FIG. 5 shows an example of an electronic program guide 500 that may be provided during this first time interval. Similarly, if the electronic program guide is displayed during a second time interval of the day (e.g., 10:00 pm to 11:30 pm), the points assigned by processor 24 during this second time interval are used to determine the order in which channels are arranged in the guide listing. FIG. 6 shows an example of an electronic program guide 600 that may be provided during this second time interval.

According to another exemplary embodiment, the time interval used for determining channel order in the guide listing may differ from the time interval in which the electronic program guide is accessed and displayed (e.g., by 30 minutes, etc.). For example, if a user accesses the electronic program guide at 8:45 pm, then processor 24 may arrange the channels in the guide listing based on the points assigned for the 9 pm to 12 pm time interval. This prevents there from being a conflict if the guide displays times that overlap two different time intervals. It also anticipates what a user might want to watch next, not what he or she might be viewing now.

As previously indicated herein, the duration of the time intervals used in practicing the present invention used may be set as a matter of design choice. It is further noted that the time intervals may be fixed and uniform in duration, or may be determined dynamically by processor 24. For example, a fixed time interval may be 6 pm to 9 pm, 9 pm to 12 am, etc. Alternatively, a time interval may be determined dynamically. For example, if user preference data (i.e., points) for a particular fixed time interval is inadequate based on an established minimum threshold, user preference data (i.e., points) for an adjacent time interval may be used to determine channel order. Moreover, the present invention may be implemented to take the day of the week or other time period into consideration when determining channel order in the guide listing. For example, user preference data may be differentiated for weekdays and weekends. In this manner, user preference data collected during weekdays may be used to determine channel order in the guide listing during weekdays, and user preference data collected during weekends may be used to determine channel order in the guide listing during weekends. Other variations of the principles of the present invention may also be used.

Although user preference data is illustrated as the viewing time for each channel and being automatically collected by the apparatus 20, the user preference data can be in a different form and can be entered by a user. For example, a user may specify program categories (such as sport and comedy) that the user wants to view in a specified interval, and may further specify a priority level for each category. The apparatus 20 may then display programs under those categories in the order of priority and at the time interval as specified by the user.

As described herein, the present invention provides a method for providing an electronic program guide based on user preference data collected at different time intervals in a day. The present invention may be applicable to various apparatuses, either with or without an integrated display device. Accordingly, the phrase "television signal receiver" as used herein may refer to systems or apparatuses including, but not limited to, television sets, computers or monitors that include an integrated display device, and systems or apparatuses such as set-top boxes, video cassette recorders (VCRs), digital versatile disk (DVD) players, video game boxes, personal video recorders (PVRs), computers or other apparatuses that may not include an integrated display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for providing an electronic program guide, comprising:
    collecting a first set of user preference data corresponding to a first time interval;
    enabling display of said electronic program guide including a list of channels at a first time of day corresponding to said first time interval; and wherein:
    said display of said electronic program guide is provided at said first time of day such that said channels are arranged in said list based on said first set of user preference data;
    said first set of user preference data includes first data indicating an amount of time each said channel is tuned to during said first time interval; and
    said first data includes points assigned to said channels during said first time interval by steps comprising:
    (a) determining which one of said channels is currently tuned to;
    (b) adding a first predetermined number of points to said currently tuned channel;
    (c) subtracting a second predetermined number of points from all said channels;
    (d) waiting a given time period; and
    (e) repeating steps (a) through (d).

2. The method of claim 1, further comprising:
    collecting a second set of user preference data corresponding to a second time interval different from said first time interval;
    enabling display of said electronic program guide at a second time of day corresponding to said second time interval; and
    wherein said display of said electronic program guide is provided at said second time of day such that said channels are arranged in said electronic program guide based on said second set of user preference data.

3. The method of claim 2, wherein: said second set of user preference data includes second data indicating an amount of time each said channel is tuned to during said second time interval.

4. The method of claim 3, wherein said second data includes points assigned to said channels during said second time interval by steps comprising:
    (a) determining which one of said channels is currently tuned to;
    (b) adding said first predetermined number of points to said currently tuned channel;
    (c) subtracting said second predetermined number of points from all said channels;
    (d) waiting said given time period; and
    (e) repeating steps (a) through (d).

5. The method of claim 2, wherein said first and second time intervals are different time intervals within a day period.

6. An apparatus for providing an electronic program guide, comprising:
    memory means for storing a first set of user preference data corresponding to a first time interval;
    processing means for enabling display of said electronic program guide including a list of channels at a first time of day corresponding to said first time interval; and wherein:
    said display of said electronic program guide is provided at said first time of day such that said channels are arranged in said list based on said first set of user preference data;
    said first set of user preference data includes first data indicating an amount of time each said channel is tuned to during said first time interval; and
    said first data includes points assigned to said channels during said first time interval by steps comprising:
    (a) determining which one of said channels is currently tuned to;
    (b) adding a first predetermined number of points to said currently tuned channel;
    (c) subtracting a second predetermined number of points from all said channels;
    (d) waiting a given time period; and
    (e) repeating steps (a) through (d).

7. The apparatus of claim 6, wherein:
    said memory means further stores a second set of user preference data corresponding to a second time interval different from said first time interval;
    said processing means enables display of said electronic program guide at a second time of day corresponding to said second time interval; and
    wherein said display of said electronic program guide is provided at said second time of day such that said channels are arranged in said electronic program guide based on said second set of user preference data.

8. The apparatus of claim 7, wherein said second set of user preference data includes second data indicating an amount of time each said channel is tuned to during said second time interval.

9. The apparatus of claim 8, wherein said second data includes points assigned to said channels during said second time interval by steps comprising:
    (a) determining which one of said channels is currently tuned to;
    (b) adding said first predetermined number of points to said currently tuned channel;
    (c) subtracting said second predetermined number of points from all said channels;

(d) waiting said given time period; and (e) repeating steps (a) through (d).

10. The apparatus of claim 7, wherein said first and second time intervals are different time intervals within a day period.

11. A television signal receiver, comprising:

a memory operative to store a first set of user preference data corresponding to a first time interval;

a processor operative to enable display of an electronic program guide including a list of channels at a first time of day corresponding to said first time interval; and wherein:

said display of said electronic program guide is provided at said first time of day such that said channels are arranged in said list based on said first set of user preference data;

said first set of user preference data includes first data indicating an amount of time each said channel is tuned to during said first time interval; and said first data includes points assigned to said channels during said first time interval by steps comprising:

(a) determining which one of said channels is currently tuned to;

(b) adding a first predetermined number of points to said currently tuned channel;

(c) subtracting a second predetermined number of points from all said channels;

(d) waiting a given time period; and (e) repeating steps (a) through (d).

12. The television signal receiver of claim 11, wherein:

said memory further stores a second set of user preference data corresponding to a second time interval different from said first time interval;

said processor enables display of said electronic program guide at a second time of day corresponding to said second time interval; and wherein said display of said electronic program guide is provided at said second time of day such that said channels are arranged in said electronic program guide based on said second set of user preference data.

13. The television signal receiver of claim 12, wherein said second set of user preference data includes second data indicating an amount of time each said channel is tuned to during said second time interval.

14. The television signal receiver of claim 13, wherein said second data includes points assigned to said channels during said second time interval by steps comprising:

(a) determining which one of said channels is currently tuned to;

(b) adding said first predetermined number of points to said currently tuned channel;

(c) subtracting said second predetermined number of points from all said channels;

(d) waiting said given time period; and (e) repeating steps (a) through (d).

15. The television signal receiver of claim 12, wherein said first and second time intervals are different time intervals within a day period.

\* \* \* \* \*